United States Patent [19]
Van Zyl

[11] Patent Number: 5,591,010
[45] Date of Patent: Jan. 7, 1997

[54] TIME SHIFT CONTROL OF WASTEWATER PUMPING SYSTEM

[75] Inventor: Ian D. Van Zyl, Peterborough, Canada

[73] Assignee: Milltronics Ltd., Peterborough, Canada

[21] Appl. No.: 375,022

[22] Filed: Jan. 19, 1995

[51] Int. Cl.$^6$ ................................................. F04B 49/00
[52] U.S. Cl. ............................................. 417/12; 417/36
[58] Field of Search .................... 417/2–8, 12, 36–41, 417/43, 53

[56] References Cited

U.S. PATENT DOCUMENTS

| | | | |
|---|---|---|---|
| 3,537,472 | 11/1970 | Yulio | 417/12 |
| 3,744,932 | 7/1973 | Prevett . | |
| 4,318,674 | 3/1982 | Godbey et al. | 417/36 |
| 4,389,164 | 6/1983 | Godbey et al. | 417/36 |
| 4,705,456 | 11/1987 | Gardeen . | |
| 4,987,913 | 1/1991 | Kodate et al. . | |
| 4,992,998 | 2/1991 | Woodward . | |
| 4,999,117 | 3/1991 | Palmu et al. . | |
| 5,064,348 | 11/1991 | McKee et al. . | |
| 5,131,271 | 7/1992 | Haynes et al. . | |
| 5,165,107 | 7/1992 | Hand et al. . | |
| 5,190,442 | 3/1993 | Jorritsma | 417/12 |

FOREIGN PATENT DOCUMENTS 58-47189  3/1983  Japan .......................................... 417/7

Primary Examiner—Timothy S. Thorpe
Assistant Examiner—Xuan M. Thai
Attorney, Agent, or Firm— Ridout & Maybee

[57] ABSTRACT

Reservoir flow or surge control systems frequently have large installed lifting or pumping capacity to deal with variations in either inflow or outflow, or both, and may form a part of a larger system of many such reservoirs. Taken together these reservoirs may have significant storage capacity. In operation such systems are large consumers of electricity. Electricity is often priced differently at different times of day. This invention employs this storage capacity to permit energy consumption to be shifted, at least in part, from periods of high electricity prices to periods of low electricity prices. This is done by permitting a greater amount of material to collect during periods of expensive electricity, and then removing the material to a lower level during periods of less expensive electricity, or the reverse, depending on the nature of the system and the material in question. Either an 'On-Off' or flow rate control method of pump control may be used. The invention is illustrated by application to a wastewater pumping system. In this case a control unit works in conjunction with a pulse-echo acoustic level sensor to control the operation of a battery of wastewater pumps at wastewater pumping stations in an urban sewage system.

7 Claims, 5 Drawing Sheets

TIME SHIFT CONTROL OF WASTEWATER PUMPING SYSTEM

FIELD OF INVENTION

This invention relates to systems in which the level of a fluent material in a reservoir is controlled by sensing the level, and controlling a pump or equivalent means to provide inflow, outflow, or both, as desired.

BACKGROUND OF THE INVENTION

In many industrial and environmental control systems reservoirs of material are used as a tool of flow control, typically to match a time variable input flow to a constant output flow, or the reverse. The systems are seen in wastewater treatment systems, freshwater reservoirs, oil tank farms, plastic feedstocks, fuel bunkers, even in grain silos. In large industrial processes the flow control system often includes pumping or lifting machinery driven by large electric motors. The electrical draw of these motors is significant.

In recent times public utilities have found that installing new electrical generating capacity to handle increased peak demand is expensive and difficult. Therefore many utilities have adopted variable pricing policies to encourage their customers to consume electricity at off-peak hours, thus evening out the demand for electricity during the day. In addition, for many years electric utilities have based certain charges on the peak use by a customer, even if the average draw is far below that of some transient peak demand condition.

Although reservoir systems may be used for storage of any liquid, or liquid like substance including viscous resins, slurry, or bulk granular material, the typical system to which this invention applies is an urban sewage drainage system. Such systems usually include a number of reservoirs, or wet wells, having inlets through which sewage and surface run-off flow are received. The rate of this inflow varies depending on factors such as the time of day, and the amount and time of rainfall or snow melt. These wells also have outlets connecting them via a common manifold to a number of pumps whose purpose is to pump out the well and thereby transfer the waste water to downstream pumping stations or processing plants. In other types of system the lifting function of pumps is performed by such lifting means as augurs or conveyor systems. These lifting or pumping systems are often adapted to cope with widely varying inflow conditions. To this end variable speed pumps have been used. A more common approach has been to use a number of less expensive constant speed pumps but to use only one or a few pumps at periods of low inflow, and to activate a larger number of pumps at periods of greater inflow. At the periods of greatest inflow, such as during a heavy thunderstorm, the installed pump capacity may be insufficient to cope with the sudden surge. In those cases the well is provided with an overflow system.

Several features of these systems are known. It is known to bring only one additional electrical motor on line at a time to reduce power surges due to starting transients. It is also known to provide a means of circulating liquid in the sump of the well to prevent the accumulation of solids that have settled in periods of low flow. It is equally known to control the number of pumps used by sensing the liquid level in the well or by measuring the inflow and outflow, typically by pressure sensing or weir measurements.

It is known to control such multiple electrical motor systems with microprocessors. The microprocessor will accept a variety of input signals, such as the depth of liquid in the well, inputs from rainfall sensing stations, or the back pressure in various pipes. It may also accept signals keyed in manually by an operator either to define pump 'On' and 'Off' depths in the well, or wells, or to override the automatic pump commands. Typically the microprocessor will also obtain information about the system from non-volatile memory. This information might include pressure versus flowrate information about the pumping system, or it might include historic rainfall versus input flowrate information. Based on programs programmed into memory the microprocessor will send signals to activate or deactivate power relays controlling the pump motors.

Most pumping systems will record the number of hours of use of each pump. Various strategies have been adopted to sequence pump usage evenly among the pumps. For example, the first pump turned on may be the one with the lowest number of accumulated hours use, the second one being the next lowest, and so on. Another method is to cycle use among the pumps on a preset sequence.

SUMMARY OF THE INVENTION

This invention relates to an apparatus and a method enabling the inherent storage capacity of such systems to be used to maintain a given level of matter in the reservoir during a period of expensive electricity, and a different level of matter during a period of less expensive electricity in a manner that reduces the overall cost of electricity consumed. In particular, the invention relates to the control of pumping systems to shift electricity consumption by such pumping systems from hours of peak electricity pricing to periods of lower electricity prices.

Reservoir systems, whether for water or for bulk commodities, have inherent storage capacity. Depending on whether it is the inflow or the outflow that is variable, level control systems are often use to add or remove material to maintain a predetermined level. Given that such surge control or constant head systems have an inherent storage capacity it is possible to allow that in use portion of that capacity to run up, or down as the case may be, during periods of expensive electricity, and then to clear the backlog condition when electricity is less expensive.

The present invention provides an apparatus and method for shifting at least a portion of electrical use from periods of higher electricity prices to periods of lower electricity prices. This is done by recognizing that wastewater wells, as in an urban sewage system, may be maintained with a nearly dry sump, or they may be maintained in a nearly full condition. In a system having many pumping stations the sum of the potential volume of water storage is significant. It is advantageous to be able to allow the wells to reach a full state during periods of expensive electricity. They may then be pumped out to a less full condition during times of less expensive electricity. Similarly, as the return of the expensive period approaches it is advantageous for the wells to be as nearly as possible pumped dry. Then the electricity use during the expensive time period may be reduced by allowing the well, or wells, to reach a nearly full condition before the period of inexpensive electricity recommences.

It will be appreciated by those skilled in the art the invention described herein for a reservoir level control system may be easily adapted to filling, or emptying as the case may be, any of the liquid or bulk commodity storage reservoir systems noted above. In each case the pumps or lifting devices must operate to deliver, or remove the material. In those circumstances the invention described herein may be applied to cause a greater amount of material to accumulate in a reservoir, or well, during periods of lower priced electricity, and a lesser volume will be caused to accumulate in that reservoir, or well, during periods of higher priced electricity. The principle of the invention is unchanged.

In each case there will be level monitoring equipment controlling electrically powered displacement means, typically a series of pumps (the term pump being taken herein to include devices having an equivalent function of displacing fluent material into or out of a reservoir). Thus the invention is applied to an installation which comprises the combination of a reservoir the combination of a reservoir containing fluent material, means for monitoring the level of fluent material in the reservoir, electrically powered displacement means associated with at least one of an inlet and an outlet of the reservoir for changing the level of fluent material in the reservoir in a first direction, and control means responsive to said monitoring means to initiate operation of said displacement means responsive to said monitored level moving beyond a first predetermined level in a second direction opposite to said first direction, and to terminate operation of said displacement means responsive to said monitored level moving beyond a second predetermined level in said first direction. According to the invention the control means responds selectively to alternative sets of first and second predetermined levels in different predetermined periods related to periods in which the price of electricity is different, a set of levels for use in periods in which the price of electricity is higher being displaced in said second direction relative to a set of levels for use in periods in which the price of electricity is lower.

Where the displacement means is a series of pumps, different control modes are possible. In one control mode the control means is operative to turn on successively an increasing number of pumps at successive predetermined levels displaced in said second direction beyond said first predetermined level, and turn off the pumps at successive predetermined levels displaced in said first direction beyond said second predetermined level, each alternative set of first and second predetermined levels being associated with its own sets of such successive predetermined levels. In another control mode the control means is operative to turn on successively an increasing number of pumps responsive to sensing a rate of change of level which is less than a predetermined rate in said first direction.

DESCRIPTION OF THE PREFERRED EMBODIMENT

Figure 1:
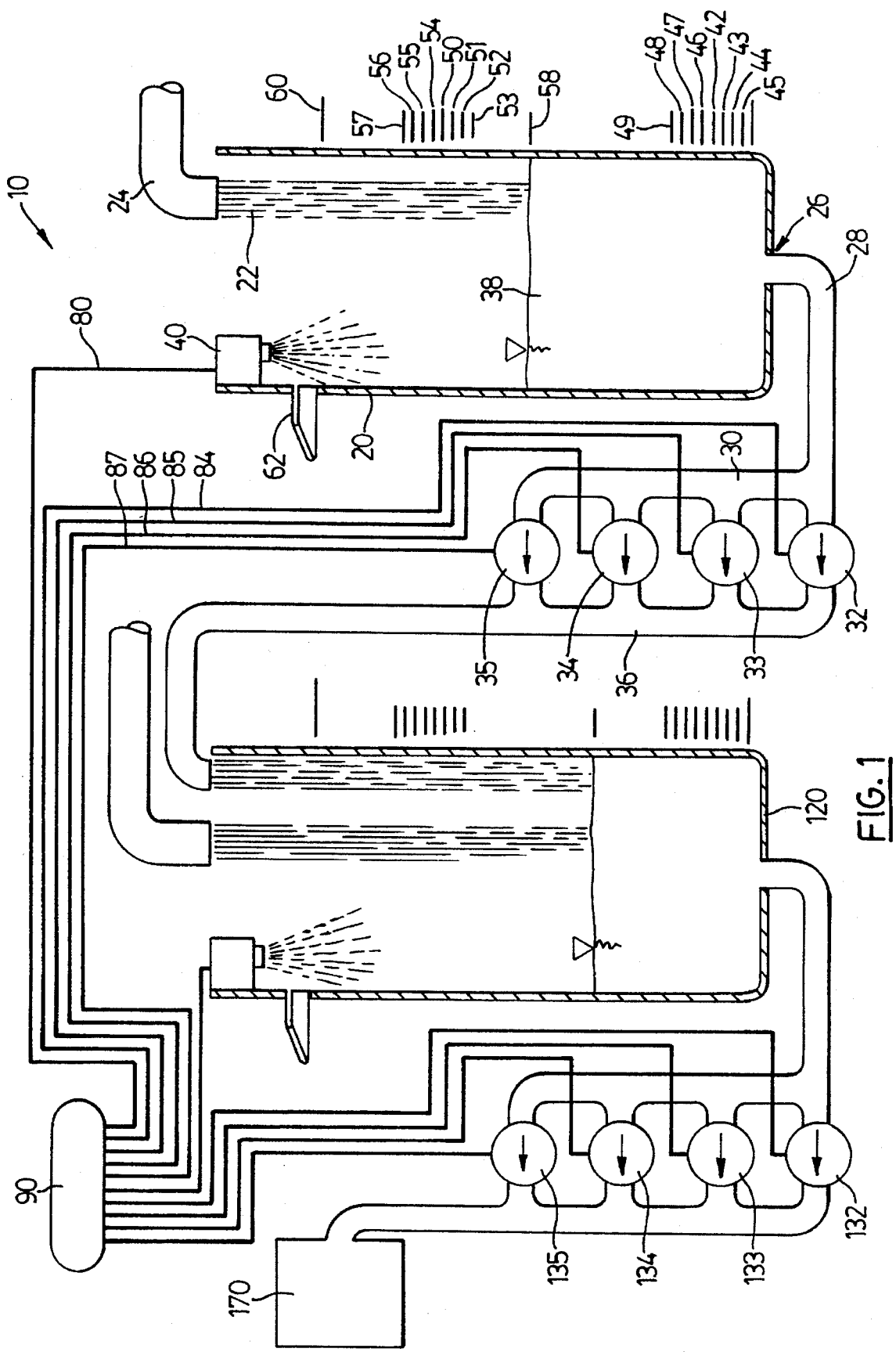
FIG. 1 is a schematic diagram of the pump control system of this invention.

The reservoir level control system of this invention operates under physical control of a microprocessor based control unit. Referring to FIG. 1, the reservoir level control system is designated generally as 10. It includes a reservoir, or a first well, 20 suitably designed to receive a fluent material which may be a liquid, a slurry or a fluent solid. In the example to be described, the fluent material is inflowing wastewater 22 from an inflow means such as a wastewater inflow pipe 24 fed by an upstream drain or sewage system (not shown). The well 20 is provided with a drain 26 and an outflow means such as an outflow pipe 28 feeding a common manifold 30. The common manifold delivers liquid to level changing means, in this instance illustrated as a first pump 32, a second pump 33, a third pump 34, and a fourth pump 35. The principles of the present invention may be adapted to apply to any system using one or more pumps, or augurs, conveyors and the like performing an equivalent function. In all cases each pump comprises an inlet, an outlet, and an electric motor whose operation is controlled by a motor control system (not shown), typically an electronic motor control as is well known to those skilled in the art. In operation the pumps 32, 33, 34, and 35 cause wastewater to flow from their respective outlets into a discharge pipe 36.

Accumulated wastewater 38 is shown within well 20. The amount of wastewater contained therein varies over time. Typically, well 20 has a known configuration and dimensions, such that the volume of wastewater in well 20 may be easily calculated as a function of the depth of wastewater in the well. Thus the volume of wastewater in the well at any time can be determined by a taking a single measurement with a sensing means for sensing the amount of material accumulated in the reservoir, or well 20, such as a liquid level sensor 40, and calculating the volume as a function of parameters pre-entered into the system. In the preferred embodiment of the present invention the liquid level sensor 40 is the transducer of an acoustic pulse-echo level detector. Known instruments of this type form the LIQUIDRANGER range of instruments manufactured by the assignee of the present application. One skilled in the art will recognize that several other well known level measuring methods may be substituted without altering the basic principles of the invention herein.

The actual wastewater liquid level, exemplarily shown as 58, will vary over time. A maximum, or alarm level is shown at 60. An overflow drain 62 leads to an overflow disposal system (not shown). The well 20 may also be provided with an agitation, aeration or flushing system (not shown) to prevent solid wastes from fermenting or forming a permanent layer of sediments at the bottom of the well. Each of the levels indicated may be altered randomly with each filling or emptying cycle. This is done to reduce the build-up of a fat 'bathtub ring' at one level in the well. Features to detect pump or electrical failures are also well known in the art. None of these features is illustrated.

Figure 2:
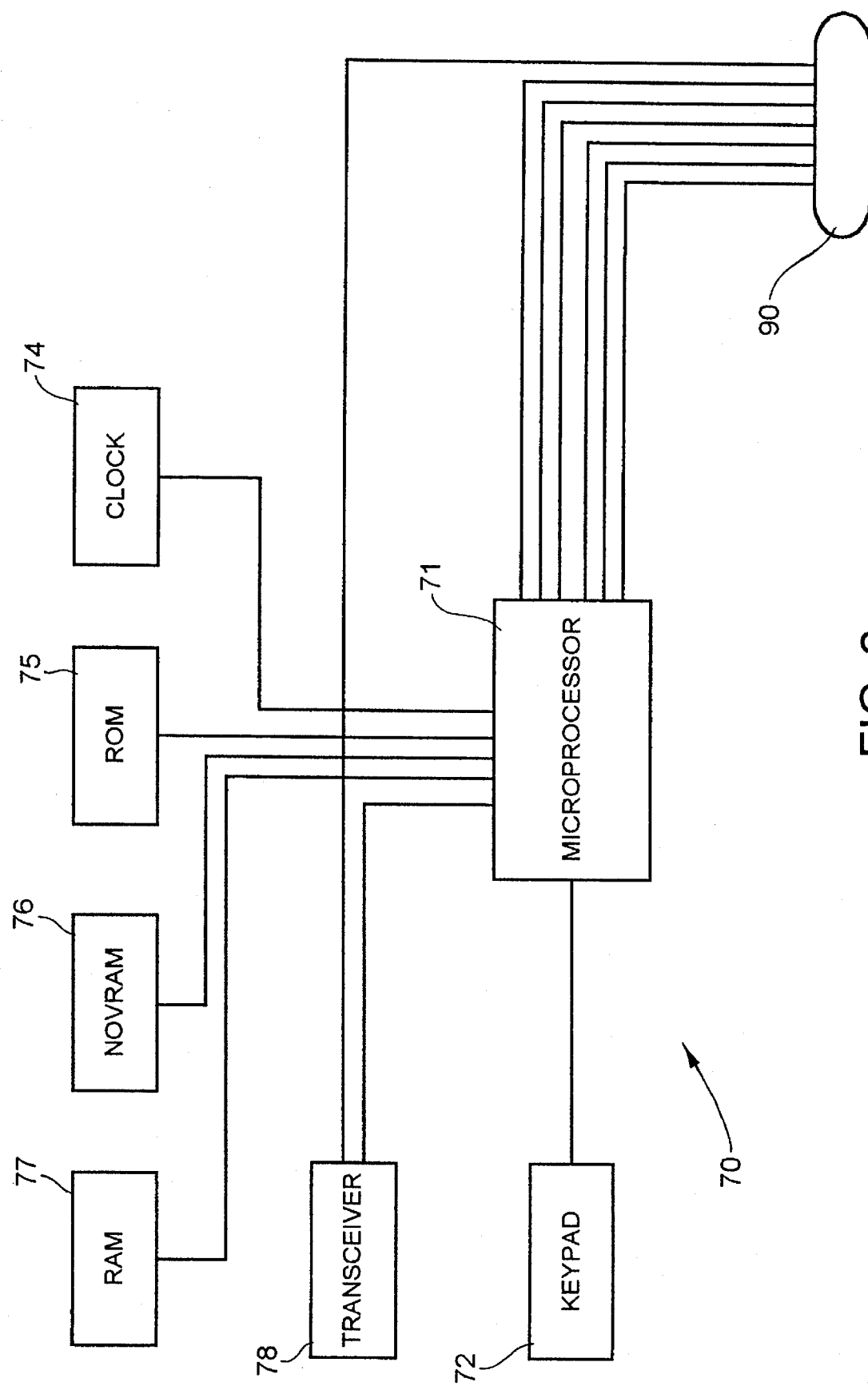
FIG. 2 is a continuation of the schematic diagram of FIG. 1.

Referring now to FIG. 2, a control unit 70 includes a microprocessor 71 which receives operator inputs from a keypad, or keyboard 72. It incorporates a real time clock 74, read only memory (ROM) 75, non-volatile memory 76, and random access memory 77° Stored in ROM 75 is a control program embodying control logic including that to be described herein. The non-volatile memory 76 may store parameters defining for example time of day versus electricity price schedules, and tables of the cross sectional area of each well in the system as a 20 function of depth. It will be understood that some or all of the above components may be combined in a suitable microcontroller. Conveniently, the controller 70 may be the same controller as is used to control a transceiver 78 associated with the level detector transducer 40, such as that provided in the LIQUIDRANGER detector, which calculates the liquid level in the reservoir and its rate of change, together with the added functions discussed below implemented in its control program and control outputs controlled thereby.

The control unit 70 is in electronic communication with both the sensor 40 through the transceiver 78 and the pumps 32 through 35. The liquid level sensor 40 provides input signals to the transceiver 78 via cable 80. The control unit provides output signals to the pumps 32 through 35, via wires 84, 85, 86, and 87 respectively. Neither the power source for the pumps, nor the operation of the power relays is shown. These are conventional matters well known to those skilled in the art. A terminal block 90 serves as the interface between the internal wiring of the control unit 70 and the external communication wiring described above.

The energy saving program of this invention forms only one part of a larger control program which includes many of the standard, known features mentioned above. It may be used in co-operation with either of two well known pump control modes. Those modes are first an 'On-Off' level control mode, and second a 'flow rate' control mode.

In the 'On-Off' mode each pump has a separate pair of 'On' and 'Off' levels. Levels 46 and 42 are a typical pair. The lowest 'On' level is for one pump, the next lowest for another pump, and so on. The 'Off' levels are typically arranged such that the first pump turned on is also the first pump to shut off. The control unit records the elapsed running time of each pump. Therefore it is possible to equalize usage of the pumps. One method is to turn on the pump with the lowest number of hours first, the next lowest number of hours second, and so forth depending on the number of pumps in the system.

In the flow rate control mode, the system only requires at any one time one set of predetermined 'On-Off' levels, those being, for example, the previously described first pump switch levels 46 and 42. The system records which pumps are in operation. A system operating in this mode may have the flow versus pressure drop characteristics of both the pumps and the piping in non-volatile memory 76, and calculations to determine the necessary number of operating pumps may be based on that knowledge and on the actual level of wastewater sensed in the well 20 and the rate of change with time of the level of wastewater. Typically such a system will turn on a first pump as the level rises past level 46 and if a target rate of change of level in the correct direction (reduction in this case) is not achieved, further pumps will be turned on until a sufficient rate of reduction is achieved. If the rate of reduction rises above the target rate, provision may be made if desired for pumps to be progressively turned off or, as the present example, they may be turned off together when the level reaches 42

Figure 3:
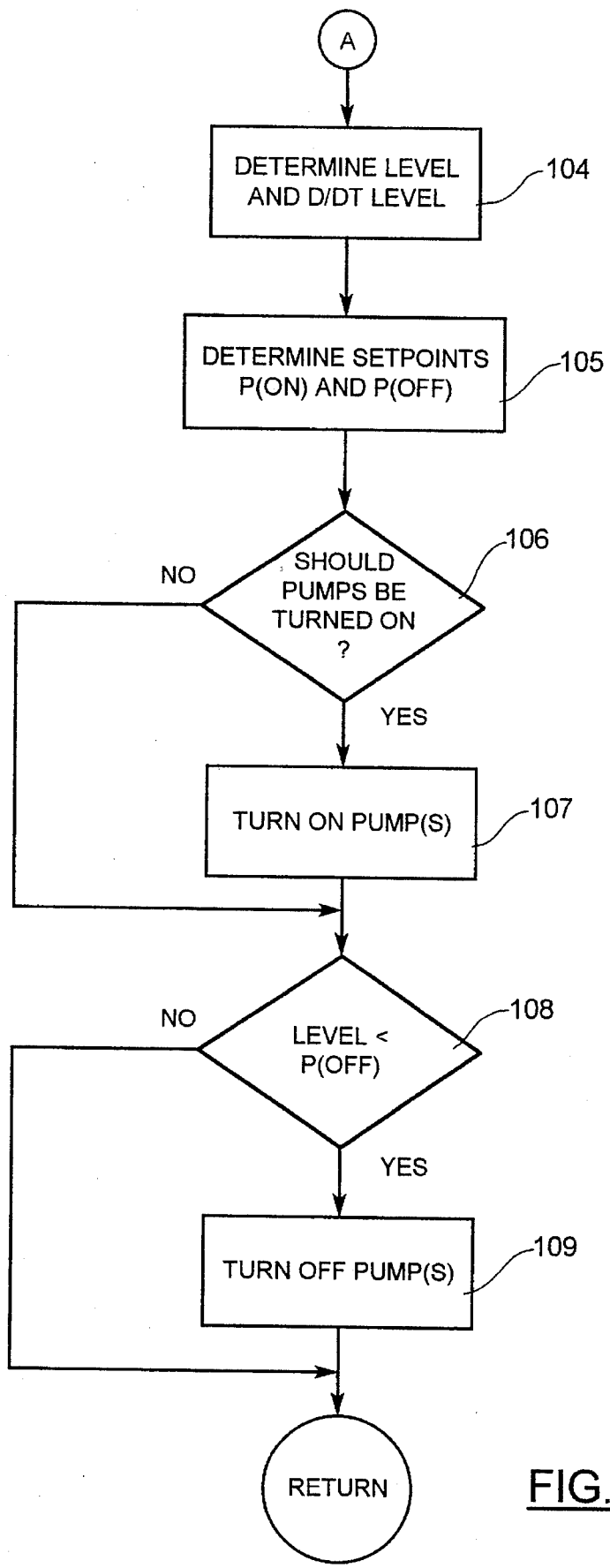
FIG. 3 is a flow diagram outlining the logic of the control system of FIGS. 1 and 2.
Figure 4:
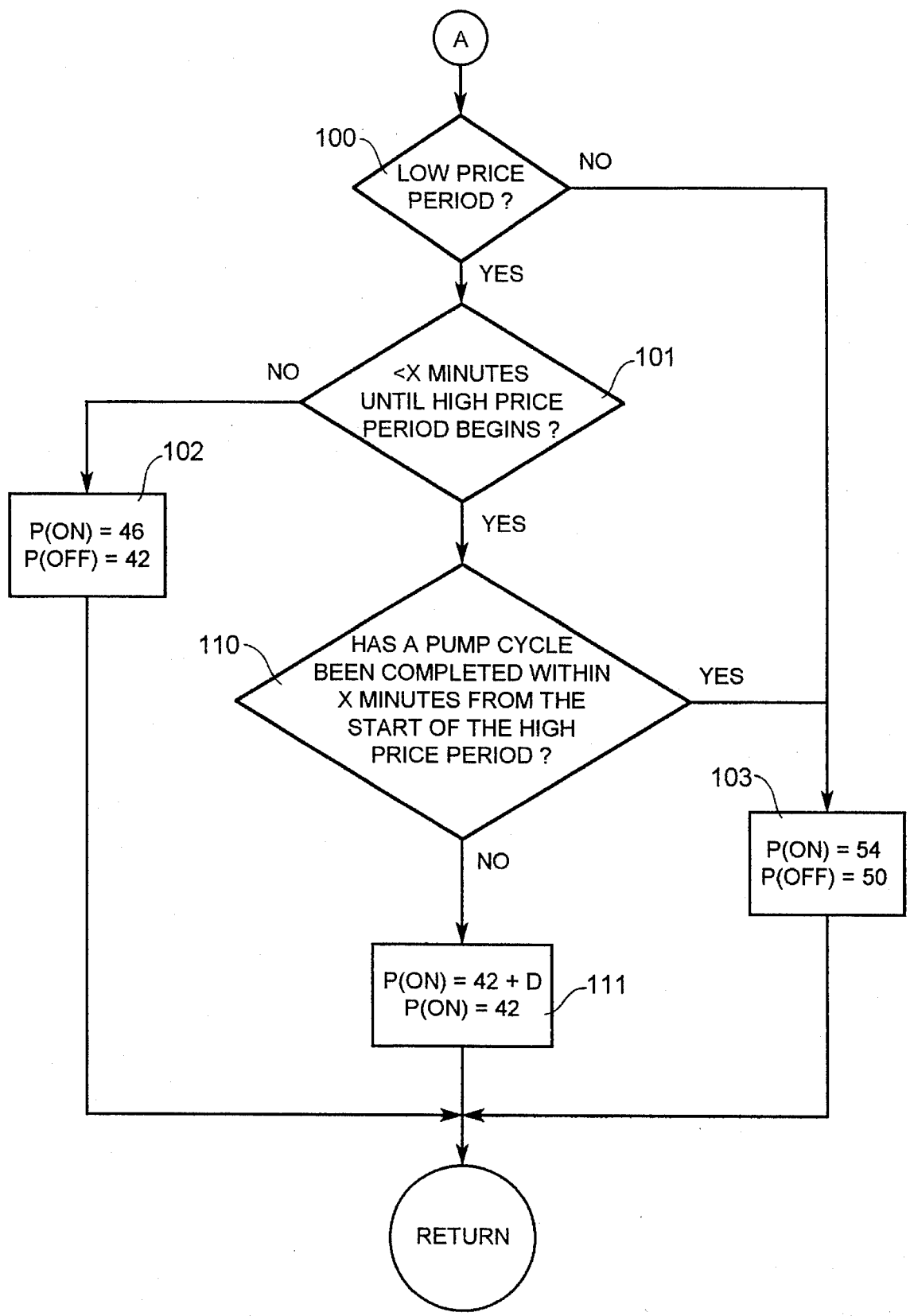
FIG. 4 is an expansion of the "Determine Switch Points" box of FIG. 3.

In operation according to the invention, in either mode, the control unit determines the time relative to an electricity price schedule stored in non-volatile memory 76 (FIG. 4, step 100). If the time is between the beginning and a time X minutes before the end of a less expensive period (steps 100 and 101), then the control unit transfers the set of liquid levels 42 and 46 to its pump 'On-Off' switch point registers in active memory (step 102). If the time is not within a less expensive period, it transfers a corresponding set of higher levels 50 and 54 to those registers (step 103). If the time is within a preselected period of X minutes prior to the end of the less expensive period, and the pumps are off and have not been running within that period (step 110), then the pump ON level is decreased to a level above the normal pump OFF level by a margin D, this causing the pumps to be turned on, while the pump OFF level remains at the normal pump OFF level 42, (see Box 111). These changes in pump ON and pump OFF levels will cause the system to initiate a pump cycle, even if the level does not exceed the ON level 46, to cause the well to be pumped down to the OFF level 42. Thereafter, the system will use the predetermined ON and OFF points for high priced periods, 50 and 54. The preset time at which this occurs is chosen by the user to allow enough time for the well to be pumped down to its empty point before the high priced time period commences. The control unit 70 operates the liquid level sensor 40 to monitor the actual level 58 of liquid in the well 20 (FIG. 3, step 104), and compare this with the levels stored in the switch point registers (step 105). If level 58 is detected to exceed level 46 (or level 54, as the case may be) (step 106) the control unit 70 turns on pumps in accordance with the pump control mode in effect (step 107). For example, in 'On-Off' mode, a first pump is activated, and if level 58 exceeds level 47 (or 55) then another pump is activated and so on. In the case of a severe thunderstorm level 58 may exceed an alarm level 60 and all pumps may be shut down to cause the run-off to divert into the overflow system via overflow 62. Provision could be made for an operator to assume manual control of any or all pumps by using the keyboard 72 to override the automatic function.

Since the control unit 70 uses the liquid level sensor 40 to determine repeatedly at known time intervals the actual wastewater level 58, the control unit 70 can determine the rate at which the level 58 is changing. This rate data is used when the pumps are operated in the flow-rate regime.

Figure 5:
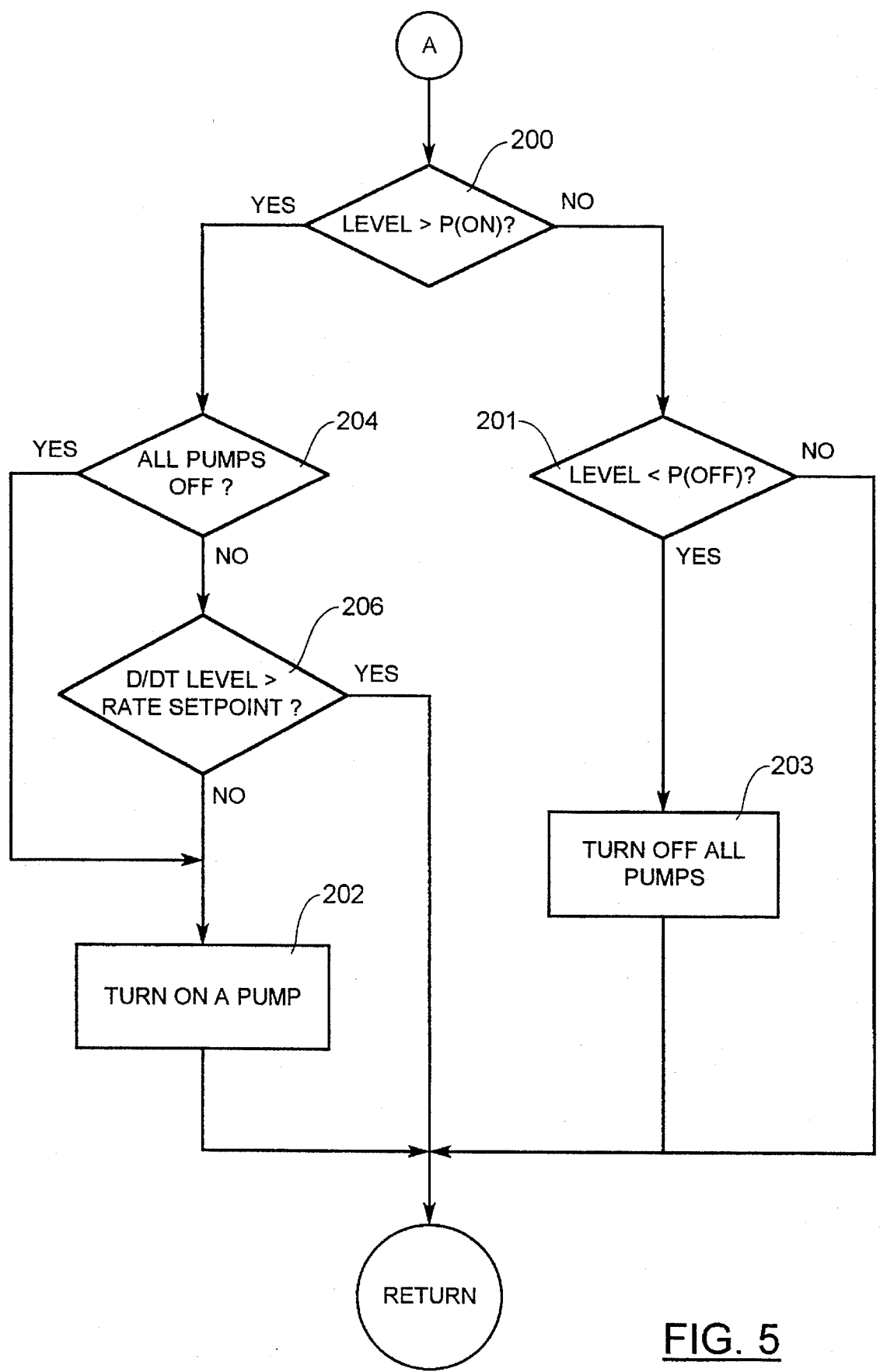
FIG. 5 is an expansion of the lower part of FIG. 3 for the case of "flow control" operation.

Normal operation in the flow-rate regime (see FIG. 5) is the same for high and low priced periods except that the target 'On-Off' levels are higher in the former, i.e. levels 50 and 54, and lower in the later, i.e. levels 42 and 46. In either case the wastewater level must exceed the respective 'On' level (step 106 or 200) before any pumps are turned on (step 107 or 202) as already described with reference to FIG. 3. Assuming that a pump is on (step 204), the next test determines whether the level is rising (step 206). If so, and if not all of the pumps are running, then an additional pump is turned on (step 202). The predetermined threshold rate of increasing wastewater (Rate(On)) is typically only marginally greater than zero. Thus, assuming there is no instantaneous large increase in inflow, activation of an additional pump causes the rate of increase to become negative. That is, the actual wastewater level falls toward the 'Off' level. If, for whatever reason, the level continues to rise then additional pumps are brought on line in turn. In all cases where a pump is turned on the control unit allows a pause for the transient condition of starting or stopping to pass before determining the rate of change of level again. Otherwise an unstable control condition may develop.

As before, if the wastewater level 58 continues to rise then the system may trip the overflow alarm at level 60. Overflow procedures (not shown) may include shutting down all pumps, or manual override by the operator.

In either mode, if the wastewater level 58 falls to the 'Off' level (step 108 or 201) 42 or 50 then all of the pumps are turned 'Off' (step 109 or 203). In normal operation the actual wastewater level 58 cycles predominantly across the range between the predetermined 'Off' level, either 42 in low priced periods, and 50 in high priced periods, and the predetermined 'On' level, either 46 in the low priced time periods and 54 in the high priced time periods.

To obtain optimal savings from the present invention it is desirable to have the well 20 pumped down to its low switch off level 42 before each price increase.

It may also be undesirable to pump out the well faster than actually required since that may drive up peak power use unnecessarily. Since many utilities use peak demand as a factor in billing it can be advantageous to keep peak demand close to average demand. To provide for this, a predetermined threshold rate of decrease, could be detected to turn off one pumps if the level of wastewater in the well 20 is falling at a rate faster than it corresponds to the displacement rate of a single pump.

Similarly, after a change to the higher price it would be possible to turn off all pumps immediately and wait until the high switch on level 50 is reached. This is what happens in the pure 'On-Off' regime described above. If the inflow rate is and remains large and several pumps are running before the price change the result would be that as soon as level 50 were crossed there would be a power surge as several pumps came on line in a short period of time. Once again, it may be preferable to permit well 20 to fill slowly to keep peak power use closer to average power use.

A reservoir system, such as a wastewater drain and treatment system may have several pumping stations. A simple example is shown in FIG. 1 in which a second well 120 receives the discharge from the first well 20. Well 120 is constructed in the same manner as described for well 20 and has corresponding pumps 132 through 135 which discharge wastewater from well 120 to a downstream facility, either another pumping station or a processing facility 170. To pump well 120 down to its lowest level before the price increases, pumps 132 through 135 must pump out the accumulated wastewater in well 120 and, in addition, the accumulated wastewater in well 20 to be delivered to well 120 by pumps 32 through 35. In general, each downstream pumping station must begin to pump down its accumulated wastewater long enough before the change in prices to cope with the sum of all the accumulated wastewater retained by all upstream pumping stations. The user must select a predetermined interval X before the price change at which to initiate a pump cycle to allow the well to be pumped as empty as possible immediately prior to the start of the high priced time period. The time can be determined by the user by taking into account the maximum flow into the well assuming all downstream stations are pumping at their maximum capacity.

While various embodiments of the invention have now been described, changes in and/or additions to the above-described embodiments may be made within the scope of the invention as set forth in the appended claims.

I claim:

1. In the combination of a reservoir containing fluent material, means for monitoring the level of fluent material in the reservoir, electrically powered displacement means associated with at least one of an inlet and an outlet of the reservoir for changing the level of fluent material in the reservoir in a first direction, and control means responsive to said monitoring means to initiate operation of said displacement means responsive to said monitored level moving beyond a first predetermined level in a second direction opposite to said first direction, and to terminate operation of said displacement means responsive to said monitored level moving beyond a second predetermined level in said first direction, the control means including a clock, the improvement wherein the control means further implements a selection routine controlled by the clock to select different sets of first and second predetermined levels in different predetermined periods determined by the clock in which predetermined periods the price of electricity is different, a set of levels for use in periods in which the price of electricity is higher being displaced in said second direction relative to a set of levels for use in periods in which the price of electricity is lower.

2. The combination of claim 1, wherein the displacement means is a plurality of pumps, and the control means is operative to turn pumps on and off according to the behaviour of said monitored level.

3. The combination of claim 2, wherein the control 30 means is operative to turn on successively an increasing number of pumps at successive predetermined levels displaced in said second direction beyond said first predetermined level, and turn off the pumps at successive predetermined levels displaced in said first direction beyond said second predetermined level, each alternative set of first and second predetermined levels being associated with its own sets of such successive predetermined levels.

4. The combination of claim 2, wherein the control means is operative to turn on successively an increasing number of pumps responsive to sensing a rate of change of level which is less than a predetermined rate in said first direction.

5. The combination of claim 1, wherein the control means implements a routine to operate said displacement means prior to the end of a period in which the price of electricity is lower so as to bring said monitored level towards said second predetermined level prior to the end of the period.

6. The combination of claim 1, wherein the level monitoring means is a pulse-echo acoustic ranging system incorporating a microprocessor having a control program, and the control means is also implemented by routines in said control program.

7. In a pumping system associated with a reservoir so as to change reservoir level in a particular direction, a method of time-shifting energy usage by the pumps including the step of controlling the pumping system to maintain a first range of reservoir levels during certain periods, and the step of controlling the pumping system to maintain a second range of reservoir levels, which is displaced further in said particular direction than said first range during intermediate periods, whereby to displace energy usage from said certain periods to said intermediate periods.

* * * * *